Oct. 21, 1930.  W. E. HARDACKER ET AL  1,779,040
SEWER FLOODING CONTROL APPARATUS
Filed May 6, 1929   4 Sheets-Sheet 1

INVENTORS
WILLIAM E. HARDACKER
EDWARD L. HESSEL
By
ATTORNEYS

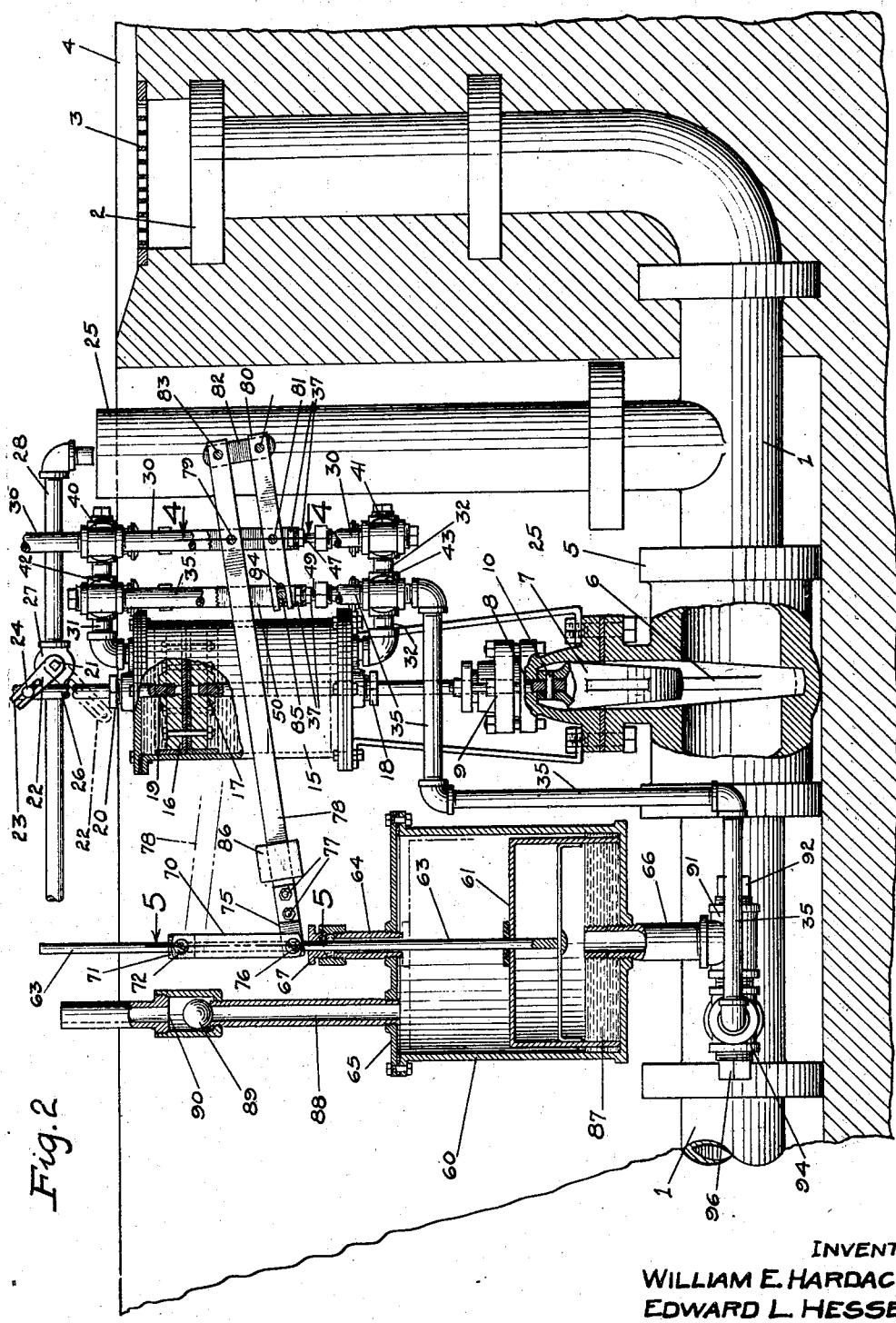

Oct. 21, 1930.　　W. E. HARDACKER ET AL　　1,779,040
SEWER FLOODING CONTROL APPARATUS
Filed May 6, 1929　　4 Sheets-Sheet 3
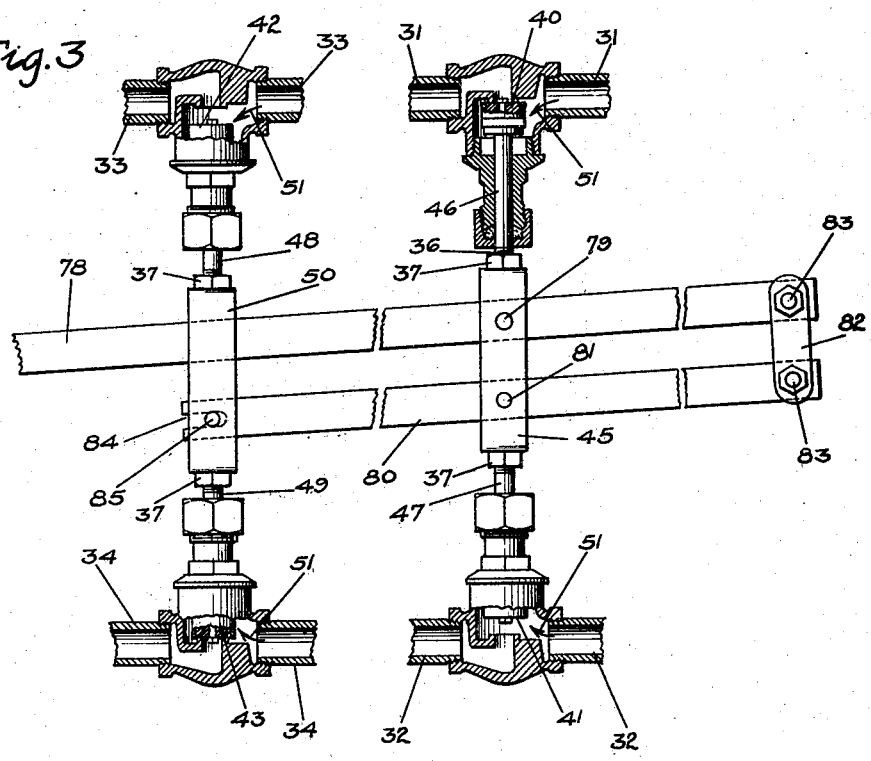
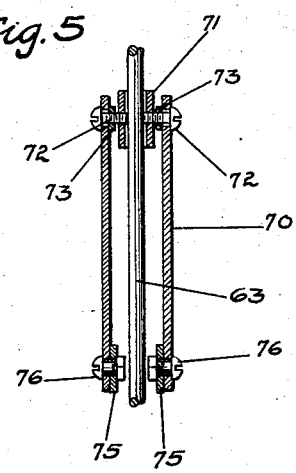
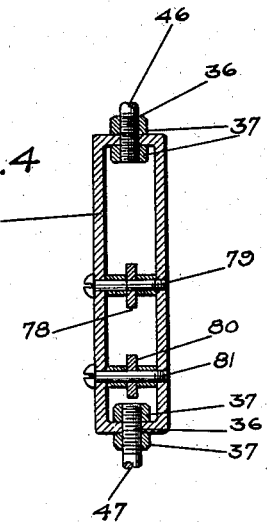
INVENTORS
WILLIAM E. HARDACKER
EDWARD L. HESSEL
ATTORNEYS Oct. 21, 1930.   W. E. HARDACKER ET AL   1,779,040
SEWER FLOODING CONTROL APPARATUS
Filed May 6, 1929     4 Sheets-Sheet 4
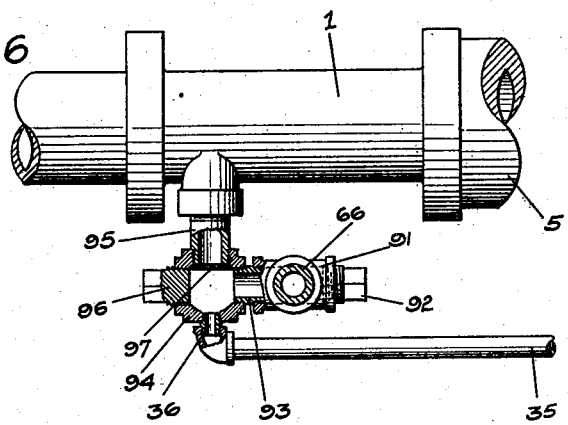
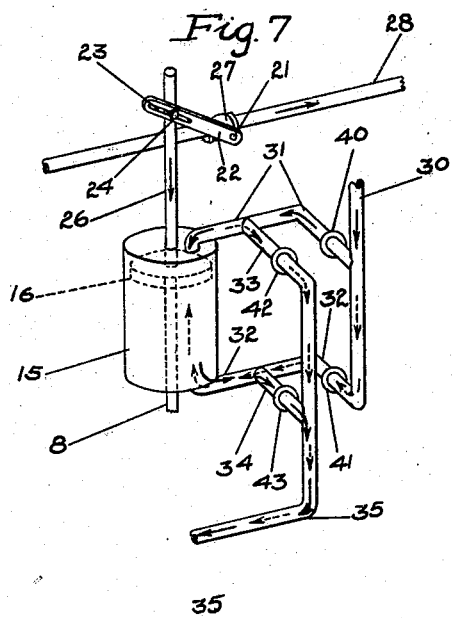
INVENTORS
WILLIAM E. HARDACKER
EDWARD L. HESSEL
ATTORNEYS Patented Oct. 21, 1930

1,779,040

UNITED STATES PATENT OFFICE

WILLIAM E. HARDACKER AND EDWARD L. HESSEL, OF MINNEAPOLIS, MINNESOTA; SAID EDWARD L. HESSEL ASSIGNOR TO CAROLINE HESSEL, OF MINNEAPOLIS, MINNESOTA

SEWER-FLOODING-CONTROL APPARATUS

Application filed May 6, 1929. Serial No. 360,820.

This invention relates to improvements in means for preventing back-up flooding from sewer drain pipes and has for its principal object to provide such a means automatically operable as the result of back-up rise in the sewer, to prevent ejection of the sewer content into the basement or into the cellar.

At any time when the capacity of a sewer is overtaxed, a back-up occurs resulting in flooding at the receiving or open end of the drains. It is the general purpose to always produce sanitary plumbing systems, and minute precautions are taken by health inspectors to further this end. The piping systems are tested under about fifty pounds pressure to prevent water, and odors from polluted water, from escaping. Ordinarily back-up water valves, hand operated gate valves, electric pumps and so forth have been used to prevent overflow of sewage into cellars, during flood times. Flat valves have been used, but sediment such as paper, matches, and so forth often render them inoperative. Gate valves have been used and are effective when they are operated before flooding takes place. However, this is unsatisfactory because ordinarily no one operates the valve in time to prevent flooding. Moreover, electrically operated valves have been used but the objection is that during storms the electrical power is often interrupted just at the time it is needed to close the valve. City ordinances require valves on all basement fixtures, a flat valve known as a Palmer valve, and they also require what are known as "blink" valves. The operation of these valves is very uncertain because they become plugged with waste material in the sewer water.

The present invention therefore provides means whereby the back-up pressure operates to automatically close a valve to prevent flooding. Although all details of construction are claimed, there is no intention to be limited entirely to these details because the gist of the invention is the provision of means automatically operable to positively and unfailingly prevent flooding, said means being operable by the sewer pipe contents. Other objects of the invention are to provide means to close the water supply to toilet flush valves so that additional sewage in any great quantity cannot be introduced into the sewage drain pipe or system during flood period and after the gate valve has been closed to prevent flooding; to include valves as part of the means for controlling the gate to open and close it, and to arrange the valve so as to utilize the city water pressure for operating them, as well as in holding them in closed position, and also to assist in moving them from closed to open position; to utilize float-operable means in turn connected with the sewer pipe in a manner to operate the float whenever a pressure, either hydrostatic or otherwise, is set up as the result of water back-up, and to have the float in turn control the valves which in turn control the opening and closing of the sewer or drain pipe valve.

Features of the invention include all details of construction, as well as the ideas of means symbolized by the illustrated embodiment of the invention.

Objects, features and advantages of the invention will appear in the description of the drawings forming a part of this application, and in said drawings Figure 1 is a plan view illustrating one embodiment of the invention;

Figure 2 is a vertical sectional elevation corresponding to Figure 1;

Figure 3 is a diagrammatic view illustrating the arrangement of the pressure line control valves;

Figure 4 is a detail sectional view of one of the valve stem connectors;

Figure 5 is a detail sectional view illustrating the adjustable connector for the float rod and valve operating lever;

Figure 6 is a plan section illustrating the means for flushing the float-operating connection by means of waste from the gate operating control valves; and Figure 7 is a schematic view illustrating the liquid flow through the pipes of the drain pipe valve control means.

Figure 1:
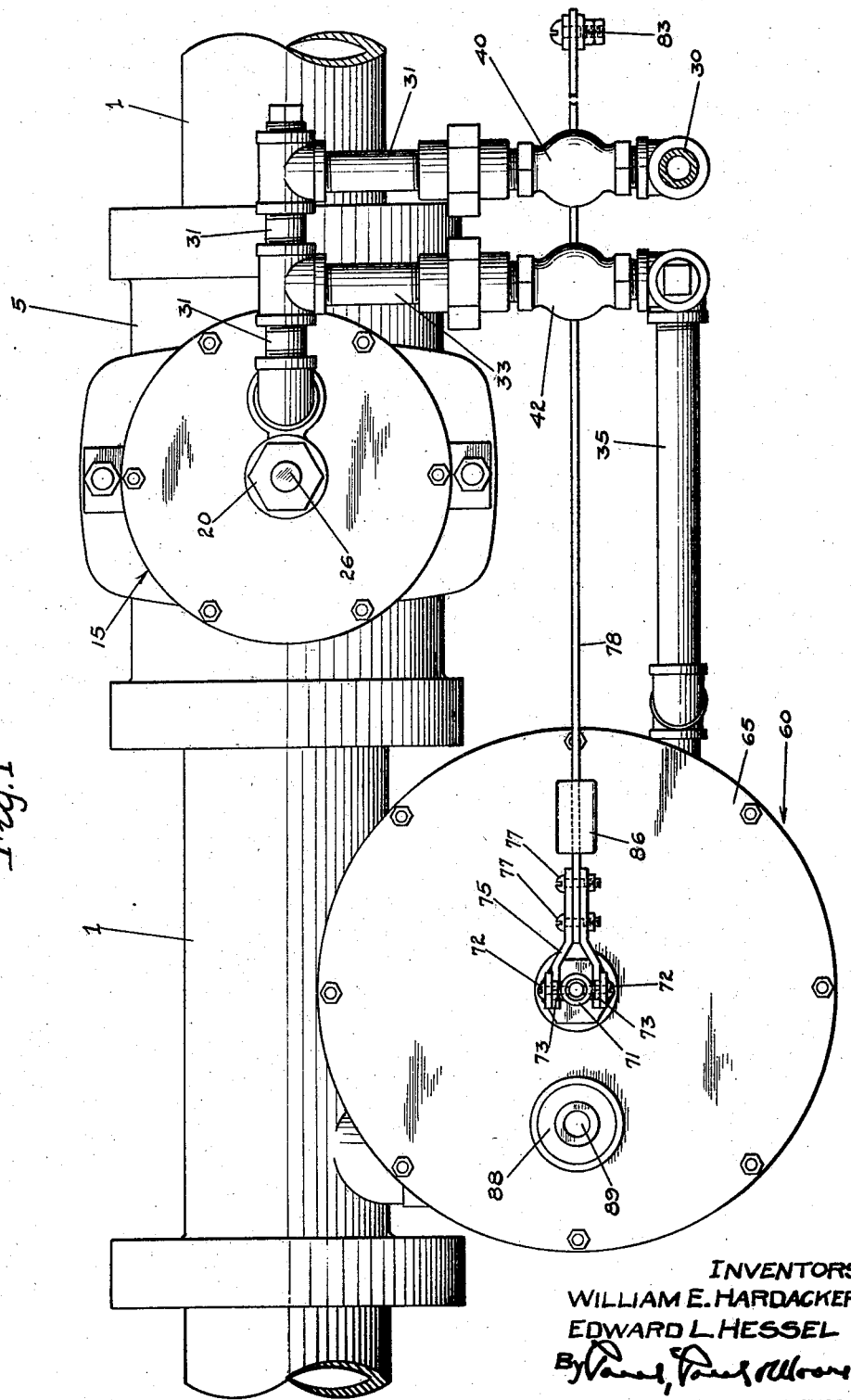

Numeral 1 designates a pipe as part of a sewerage or drainage system, having a vertical portion the open upper or receiving end of which lies below a grating 3 arranged in the floor 4 of a basement. Numeral 5 represents the casing of a gate valve forming a part of the pipe or line 1, and including the gate valve seat 6, gate 7 and stem 8 for operating the gate. The stem passes through a suitable stuffing box 9. Any suitable type of valve may be used, but a gate valve has thus far been found to give the best results. The connection of the operating element 8 can be made in any preferred manner but is here shown as made by means of a pin 10, the end of the element 8 being in threaded engagement with the gate 7.

Means is provided and connected to operate the valve to open and close it, thus controlling flow through the sewer drain pipe to prevent overflow at the receiving end 2 of the pipe 1. In this instance, the means just mentioned include, pressure operable devices; a float arranged at a level below the open end 2 of the pipe 1, and a connection establishing communication between pipe 1 and the float, so that said float is operated as the result of sewer "back-up" and therefore by means of liquid or even gas pressure set up in the sewer drain pipe as the result of flood conditions. In other words, this intercommunicating connection provides means by which the back-up effects are available to operate the float or equivalent device, said float or equivalent element being connected with the sewer pipe valve operating means so that whenever back-up pressure, or liquid level, has reached a predetermined figure, the drain pipe control valve is closed.

Although every detail of construction of every part of the now-to-be-described mechanism is claimed, there is no intention to be entirely limited to such detail inasmuch as it is conceivable that other equivalent means may be employed for obtaining automatic closing of the flood-preventing valve as the result of pressures or equivalent effects created by the flow of liquid, or of gas, in a direction toward the opening 2.

The means to operate the valve 7 to open and close it, includes a pressure-operable device having a cylinder 15 suitably supported and having a piston 16 to one side of which the connector 8 is secured by threading as at 17. The connector 8 passes through a suitable stuffing box 18. A guide rod 26 is connected as a 19 to the opposite side of the piston and extends upwardly through a suitable stuffing box 20. This rod also functions as means for operating a valve which controls the city water supply to a toilet flush valve (not shown) so that when the valve 7 is closed, no great additional quantity of sewage can be introduced through the toilet waste pipe 25 during a flood period and when the gate valve is closed. It is assumed that the sewer pipe 25 leading from a toilet or toilets enters the pipe 1 at a point between the gate valve 7 and the open end 2 of the pipe 1. It is obvious that while the gate 7 is closed, an overflow at 2 would occur if any great quantity of sewage were emptied into the pipe 25, from any source. It will be understood that the valve 27 which is operated by the guide rod 26 is located in the flush water line so that its closing does not affect the flow through the water lines and gate control valves later to be described. Any suitable connection may be made between the guide rod 26 and the valve 27 for example a connection such as shown in Figures 2 and 7, comprising a valve stem 21, a lever 22 for operating the stem, said lever having a slot 23 through which a pin 24 loosely passes, which pin is suitably threaded into the guide rod 26. The valve is of the type which opens or closes when its stem is rotated through an arc of 90°, and it will be seen that the parts are so proportioned that the valve will be closed when the piston 16 reaches its lowermost position and it will be opened when said piston reaches its uppermost position. The sewer pipe 25 is supposed to be connected with a toilet (or other device to be flushed) although no such device has been shown. Furthermore, the flush valve which would ordinarily be in the flush pipe line 28, and which would deliver, by way of the toilet, into the pipe 25 has not been shown. Figure 2 is therefore in this respect diagrammatic, the idea being to provide means so that no appreciable amount of waste or flush water can be delivered into the pipe 25 after the valve 7 closes, due to the fact that when valve 7 closes, valve 27 also closes.

The general arrangement of the pressure pipes and valves for controlling flow to opposite sides of the piston 16, and the directions of fluid flow are best shown in Figure 7. The house water supply pipe or other pressure pipe line is shown at 30, and this pipe has branches respectively indicated at 31—32 which deliver into opposite ends of the cylinder 15. Branch pipes respectively indicated 33—34 lead from respective pipes 31—32, and communicate with a common waste water pipe 35 which is arranged to deliver into a certain connection which establishes communication between the pipe 1, and a portion of the mechanism which controls the valve 7, as the result of back-up effects, to flush the connection and thus prevent plugging by drain pipe contents.

Interposed in branches 31—32—33—34 are valves respectively designated 40—41—42—43. Referring to Figure 3, it will be noted that the valves 40—41 have their stems 46—47 adjustably connected to a common operating element 45, also see Figure 4. Likewise, the stems 48—49 respectively of the valves 42—43 are adjustably connected to the common operating member 50. The valves 40—41 (see Figure 7) control fluid supply respectively to the top and bottom of the cylinder 15. The valves 42—43 when open permit drain flow of water respectively from the top and bottom of the cylinder. The valves are so arranged that when valve 40 is open water under pressure is delivered to the top of the cylinder for closing the valve, drain or waste valve 42 is closed, while drain valve 43 is opened to permit egress of water from that portion of the cylinder below the piston 16 so that the cylinder may move downwardly to close the gate valve. When the gate valve is closed and it is desired to open the same, drain valve 42 is opened, drain valve 43 is closed, pressure valve 40 is closed and pressure valve 41 is open allowing water under pressure to be delivered to the cylinder beneath the piston.

A feature of the invention also includes the arrangement of each valve, see Figure 3, whereby the fluid pressure is applied in a manner to assist in holding the valves closed, and in a manner to assist in shifting the valves either to open or closed position. For this purpose, the pressure delivery is at the point indicated and in direction of arrow 51. With the delivery at the point 51 as shown, and after the valves start to move in either direction the pressure assists their further movement, and after the movement in one direction is completed to close one of the valves, the pressure acts to assist in maintaining the valve in closed position. This applies to each unit including in one instance the elements 45—40—41 and in the other instance the elements 50—42—43.

Means is also provided to operate the valves just described in a manner to obtain proper movements of the piston respectively to open and close the valve 7 and to maintain it in each limit position. This means includes in this instance a float-operable device, and devices connecting the float with the cylinder control valves to properly manipulate them for the purposes mentioned. The float-operable device about to be described, including a float member, is also claimed as a structure performing the function herein, to wit that of utilizing back-up pressure or rise of sewer back-up contents to obtain operation of the cylinder control valves or of equivalent sewer pipe valve operating means, in a manner to close this valve 7. The device, see Figure 2, comprises a closed receptacle 60 having a float element 61 freely operable therein. The float has a rod 63 passing loosely through a suitable, in this instance tubular, guide 64 attached to the cover 65 of the casing. The rod 63 passes through a stuffing box 67. A pressure or back-up connection is indicated at 66, and is extended upwardly into the casing or cylinder 60, and communicates at its opposite end with the pipe 1 at that side of the valve 7 opposite the opening 2, see Figures 6 and 2. When sufficient pressure as the result of back-up liquid or gas has been set up the float will be raised and also the rod 63. Adjustably secured upon the rod 63 is a connector 70, see Figures 5 and 2. This element includes two side members connected to a collar 71 by means of headed set screws 72, the set screws being in threaded engagement with clamping nuts 73 as well as with collar 71, and thus the element 70 can be adjusted lengthwise of the rod 63. A forked structure 75, see also Figure 1, is connected by means of bolts 76 to the connector 70, and this structure is in turn connected by bolts 77 to a lever 78 pivoted to the connector 45 as at 79. A second lever 80 is pivoted to the element 45 as at 81, and the levers 78 and 80 are pivotally connected by a link 82 by means of suitable devices 83—83. The end of the lever 80 is slotted as at 84 and is engaged with a pin 85 carried by the connector 50. A weight 86 is slidable along the lever 78, to adust the balanced relation of the system. When the float rises from its position shown in Figure 2, the first part of the upward movement results in closing of the waste valve 42 and opening of the waste valve 43 preparatory to the application of pressure to force the piston 16 downwardly to close the valve 7, which pressure is subsequently obtained by opening of valve 40 and closing of valve 41. The pressure flow is now in direction of the full line arrows of the diagram, Figure 7. The piston 16 descends and also the gate valve 7 moves to its closed position. It is maintained in closed position until the pressure is released sufficiently for the float 61 to fall which corresponds to the termination of the flood period. As the float 61 descends the valves are manipulated to open waste valve 42, close waste valve 43, to open pressure valve 41 and close pressure valve 40. The pressure is then applied to the bottom of the cylinder by flow in direction of the dotted arrows of Figure 7, and the piston 16 moves upwardly to the position shown in the drawings, and the valve is opened. The pressure applied for holding the gate valve closed is anywhere within the range of six hundred to fifteen hundred pounds. This force is sufficient to assure a proper unfailing seating of the valve 7, even though sediment or sewer waste be in the path of valve movement. A liquid seal 87 is provided for the float 61 which is only open at its lower side as shown. A suitable air vent pipe 88 leads from the top of the cylinder 60, and a rubber check valve 89 permits egress of air, but prevents egress of liquid by being floated against valve seat 90.

Although it is desirable to have the waste valves 42—43 opened first, preparatory to application of pressure to the piston 16 it will be understood that the adjustment of the levers may be such that all valves are operated simultaneously. It will again be noted that the elements 46—47 are adjustably connected with the connector 45, see Figure 3. For this purpose the ends of element 46 are threaded as at 36, and nuts 37—37 provide means for securing the elements 7 in adjusted position which adjustment is merely made by rotating the elements so that the threads feed inwardly or outwardly as desired. The same adjustment is provided between the connector 50 and the valve stems 48—49. It is also possible that the tension on the stems may be varied by the packing box nuts, to vary the sequence of opening respectively of the waste and pressure control valves.

Another feature of the invention includes means whereby the drain line 35, which is also a pressure line acts to flush the connection generally designated 66, and to thus prevent such clogging as would interfere with the transmission of pressure (or of back-up effects) from pipe 1 to a point beneath the float 61. The connection 66 in this instance includes a T 91 closed at one end by plug 92, a nipple 93, a "four-way" or "cross" 94, a nipple 95 connecting one side of the "cross" or "four-way" with the pipe 1, and a plug 96 which permits access to, a strainer element 97 disposed to prevent the entry of sediment into the nipple 93 or into the float-operating or pressure connection. The drain pipe 35 leads into the "four-way" as at 36 in a direction to flush the pipe 95. Thus whenever drainage is taking place through the pipe 35, the "four-way" and the element 95 will be flushed, and a kind of injector action will take place during recession period of the back-up sewer pipe contents to assist in emptying the connection 66. Moreover, during the back-up period discharge through the waste 35 may assist in raising the float notwithstanding the fact that the flow through the waste pipe is counter to the flow from the pipe 1 through the connection 66.

Referring to Figure 1, it is to be again noted that the valves 40, 41, 42 and 43 have the intakes arranged so that water enters towards the face of the seat, as distinguished from an entry from the opposite direction, so that intake pressure to the cylinder and outlet pressure from the cylinder assists in bringing the valves to and holding them in their final positions. In other words, in the present invention, the pressure is first applied in the chamber which contains the head of the movable valve element.

We claim as our invention:

1. In combination a sewer drain pipe, a valve for controlling the pipe, means connected to operate the valve to open and close it, including pressure pipe lines and valves controlling the lines in a manner to obtain the required reversing movements of the drain valve, means for controlling the pressure line valves including a float, and a connection communicating with the sewer drain pipe and with the float so that rise of water in the pipe will operate the float, and obtain the proper movement of the pressure line valves to cause the sewer pipe valve to close.

2. In combination a sewer drain pipe, a valve for controlling the pipe, means connected to operate the valve to open and close it including pressure pipe lines and valves controlling the lines in a manner to obtain necessary reversing movements of the valve operating means and also including a waste water pipe from which the fluid is ejected under pressure, means for controlling the pressure line valves including a float, and a connection communicating with the sewer drain pipe and with the float so that rise of water in the pipe will operate the float and obtain the proper movement of the pressure line valves to cause the sewer pipe valve to close, said pressure waste water pipe being arranged to deliver into said connection in a manner to flush it, and thus prevent plugging by sewer pipe contents.

3. In combination with a sewer drain pipe, a valve controlling the pipe, a fluid-operable apparatus connected to control the valve, including pressure pipe lines and valves arranged to obtain reversing movements of the fluid-operable apparatus to open and close the valve, a float-operable apparatus including an intercommunicating connection by which the float is controlled as the result of back-up sewer pressure, and connections between the float-operable apparatus and the pressure line valves for moving the valves to obtain closing of the sewer pipe valve as the result of back-up pressure.

4. In combination with a sewer drain pipe, a valve controlling the pipe, a fluid-operable apparatus connected to control the valve including a pressure pipe line and valves arranged to obtain reversing movements of the fluid-operable apparatus to open and close the valve, a float-operable apparatus including an intercommunicating connection by which the float is controlled as the result of back-up sewer pressure, and connections between the float-operable apparatus and the pressure line valves for moving the valves to obtain closing of the sewer pipe valve as the result of back-up pressure, the valves being so arranged that the pressure assists in their opening and closing movements.

5. In combination with a sewer drain pipe, a valve controlling the pipe, means for operating the valve to open and close it, including pressure pipe lines and valves controlling the lines, float-operable means for controlling the pipe line valves and including an intercommunicating connection by which said first float-operable means is operated to close the valve as the result of back-up pressure in the sewer pipe, before sewer contents reaches the level of the open end of the drain pipe, the valves being so arranged that the pressure assists in their opening and closing movements, and in holding them closed.

6. In combination with a sewer drain pipe, a valve controlling the pipe, a fluid operable apparatus connected to control the valve including pressure pipe lines and valves arranged to obtain reversing movements of the fluid-operable apparatus to open and close the valve, a float-operable apparatus including an intercommunicating connection by which the float is controlled as the result of back-up sewer pipe pressure, and connections between the float-operable apparatus and pressure line valves for moving the valves to obtain closing of the sewer pipe valve as the result of back-up pressure.

7. In combination with a sewer drain pipe, a valve controlling the pipe, a fluid-operable apparatus connected to control the valve including pressure pipe lines and valves arranged to obtain reversing movements of the fluid-operable apparatus to open and close the valve, a float-operable apparatus including an intercommunicating connection by which the float is controlled as the result of back-up sewer pipe pressure, and connections between the float-operable apparatus and pressure line valves for moving the valves to obtain closing of the sewer pipe valve as the result of back-up pressure.

8. In combination with a sewer drain pipe, a valve controlling the pipe, a fluid-operable apparatus connected to control the valve including pressure pipe lines and valves arranged to obtain reversing movements of the fluid-operable apparatus to open and close the valve, and also including a waste water pipe, a float-operable apparatus including an intercommunicating connection by which the float is controlled as the result of back-up sewer pipe pressure, and connections between the float-operable apparatus and pressure line valves for moving the valves to obtain closing of the sewer pipe valve as the result of back-up pressure, said waste water pipe being arranged to deliver into said connection in a manner to flush it and thus prevent plugging by sewer pipe contents.

9. In combination with a sewer drain pipe, a valve controlling the pipe, a fluid-operable apparatus including a piston, said fluid-operable apparatus being connected to control the drain pipe valve and including pressure pipe lines and valves arranged to obtain reversing movements of the fluid-operable apparatus to open and close the valve, a float-operable apparatus including an intercommunicating connection by which the float is controlled as the result of back-up sewer pressure, connections between the float-operable apparatus and the pressure line valves for moving the valves to obtain closing of the sewer pipe valve as the result of back-up pressure, a sewer connection communicating with the drain pipe between the valve and the receiving end of the drain pipe, a flush water supply pipe for said sewer connection, a valve for controlling said flush pipe, and connections for causing said flush pipe valve to be closed by said piston when the sewer drain pipe valve is closed.

10. In combination with a sewer drain pipe, a valve for controlling the pipe, fluid-pressure-operable means adapted to obtain reversing motions of the valve to open and close it, and means operable as the result of back-up pressure in the drain pipe to control said fluid-pressure-operable means.

11. In combination with a sewer drain pipe, a valve for controlling the pipe, a cylinder having a piston connected to the valve, means for delivering fluid under pressure to opposite sides of the piston to obtain the required reversing movements thereof, and means for controlling the fluid delivery means by the rise of back-up water in the sewer drain pipe.

12. In combination with a sewer drain pipe, a valve for controlling the pipe, a cylinder having a piston connected to the valve, means for delivering fluid under pressure to opposite sides of the piston to obtain reversing movements thereof, means for controlling the fluid delivery means including a float, and a connection communicating with the sewer drain pipe on the sewer side of the valve and with the float so that rise of water in the connection will operate the float.

13. In combination with a sewer drain pipe, a valve for controlling the pipe, a cylinder having a piston connected with the valve, a pressure system including pipes and valves arranged to deliver fluid alternately to opposite sides of the piston, and including a waste pipe common to both sides of the piston, certain of the valves being adapted to permit drainage under pressure at corresponding opposite sides of the piston and means for operating the valves as the result of back-up pressure in the drain pipe to give a valve closing motion to the piston.

14. In combination with a sewer drain pipe, a valve for controlling the pipe, a cylinder having a piston connected with the valve, a pressure system including pipes and valves arranged to deliver fluid alternately to opposite sides of the piston and including a waste pipe common to both sides of the piston, certain of the valves being adapted to permit drainage under pressure at corresponding opposite sides of the piston, and means for operating the valves as the result of back-up pressure in the drain pipe to give a valve closing motion to the piston, said last mentioned means including a pipe connection with the drain pipe, and said waste pipe delivering into said connection to pressure-flush it.

15. In combination with a sewer drain pipe, a valve for controlling the pipe, a cylinder having a piston connected with the valve, a pressure system including pipe and valves arranged to deliver fluid alternately to opposite sides of the piston and including a waste pipe common to both sides of the piston and adapted to permit drainage at corresponding opposite sides of the piston during its reversing motions, a float chamber having a float therein, levers connecting the float with the valves to control them, and a connection between the float chamber and the drain pipe adapted to cause operation of the float as the result of back-up in the drain pipe.

16. A device for the purpose described including a pipe connection having a valve, a cylinder having a piston connected to operate the valve, a fluid delivery system including pipes and valves arranged to deliver fluid alternately to opposite sides of the piston, and also including a waste pipe common to both sides of the piston, certain of the valves being adapted to control drainage under pressure from the corresponding opposite sides of the piston.

17. A device for the purpose described including a pipe connection having a valve, a cylinder having a piston connected to operate the valve, a fluid delivery system including pipes and sets of valves arranged to deliver fluid alternately to opposite sides of the piston, and also including a waste pipe common to both sides of the piston certain of the valves being adapted to control drainage under pressure from corresponding opposite sides of the piston, means connecting members of each set of valves, and means having pivotal connection with said connecting means to operate the valves.

18. A device for the purpose described including a pipe connection having a valve, a cylinder having a piston connected to operate the valve, a fluid delivery system including pipes and valves, and also including a waste pipe, certain of the valves being adapted to control drainage under pressure from the waste pipe.

19. A device of the class described including a cylinder having a piston therein, and a fluid pressure system including pipes arranged to deliver into the cylinder at opposite sides of the piston, and pipes communicating with these pipes, along with valves arranged to alternately admit pressure to one side of the piston and to permit ejectment of fluid contents from corresponding opposite sides of the piston, each valve including a movable member, arranged in a chamber, and said valves being so arranged that pressure is applied to the chamber which contains the head of the movable valve element.

20. A device of the class described including a cylinder having a piston therein and a pipe system including elements arranged to deliver into the cylinder at opposite sides of the piston, and pipes communicating with these pipes, along with a pair of valves arranged in the cylinder delivery pipe and adapted to be operated in unison to alternately admit pressure to opposite sides of the piston, and a pair of valves adapted to be operated in unison to release fluid under pressure from corresponding opposite sides of the piston, all of said valves being so arranged that the pressure is applied in a manner to assist in bringing the valves to and holding them in closed position.

21. A device of the class described including a cylinder having a piston therein and a pipe system including elements arranged to deliver into the cylinder at opposite sides of the piston, and pipes communicating with these pipes, along with a pair of valves arranged in the cylinder delivery line and adapted to be operated in unison to alternately admit pressure to opposite sides of the piston, and a pair of valves adapted to be operated in unison to release fluid under pressure from corresponding opposite sides of the piston, each valve including a chamber in which a movable valve element operates, and said valves being so arranged that the pressure is first applied directly to the chamber which contains the heads of the movable valve element, and flows outwardly therefrom when the valve is open, whereby the pressure assists in bringing the valves to and holding them in closed position.

In witness whereof we have hereunto set our hands this 30th day of April, 1929.

WILLIAM E. HARDACKER.
EDWARD L. HESSEL.